(12) United States Patent
Valentini et al.

(10) Patent No.: US 8,523,997 B2
(45) Date of Patent: Sep. 3, 2013

(54) CELLULAR PHOSPHATE CERAMICS AND METHODS OF MANUFACTURE AND USE

(75) Inventors: Silvia C. Valentini, West Chester, PA (US); Youhong Li, Cherry Hill, NJ (US); Anthony Mario Coratolo, Erial, NJ (US)

(73) Assignee: Engineered Arresting Systems Corporation, Aston, PA (US)

( * ) Notice: Subject to any disclaimer, the term of this patent is extended or adjusted under 35 U.S.C. 154(b) by 252 days.

(21) Appl. No.: 13/006,900

(22) Filed: Jan. 14, 2011

(65) Prior Publication Data

US 2011/0177933 A1 Jul. 21, 2011

Related U.S. Application Data

(60) Provisional application No. 61/294,986, filed on Jan. 14, 2010.

(51) Int. Cl.
*C04B 12/02* (2006.01)

(52) U.S. Cl.
USPC ........... 106/672; 106/682; 106/690; 106/691; 106/801; 106/802

(58) Field of Classification Search
USPC ................. 106/672, 682, 690, 691, 801, 802
See application file for complete search history.

(56) References Cited

U.S. PATENT DOCUMENTS

| | | | |
|---|---|---|---|
| 3,960,580 A | 6/1976 | Stierli et al. | |
| 4,141,744 A | 2/1979 | Prior et al. | |
| 4,394,174 A | 7/1983 | Tomic | |
| 4,603,085 A | 7/1986 | Fidler et al. | |
| 4,619,860 A | 10/1986 | Brown et al. | |
| 4,749,413 A | 6/1988 | Tomic | |
| 4,978,642 A * | 12/1990 | Barrall | 501/84 |
| 5,789,681 A | 8/1998 | Angley et al. | |
| 5,830,815 A | 11/1998 | Wagh et al. | |
| 5,846,894 A | 12/1998 | Singh et al. | |
| 5,885,025 A | 3/1999 | Angley et al. | |
| 6,143,069 A | 11/2000 | Brothers et al. | |
| 6,204,214 B1 | 3/2001 | Singh et al. | |
| 7,044,222 B2 | 5/2006 | Tomlinson | |
| 7,413,014 B2 | 8/2008 | Chatterji et al. | |
| 7,628,951 B1 | 12/2009 | Akash et al. | |

(Continued)

FOREIGN PATENT DOCUMENTS

| | | |
|---|---|---|
| GB | 1558059 A | 12/1979 |
| GB | 1567400 A | 4/1980 |
| WO | WO-9635647 | 11/1996 |
| WO | WO2011088286 A2 | 7/2011 |

OTHER PUBLICATIONS

International Search Report and Written Opinion dated Aug. 24, 2011 in Application No. PCT/US2011/021240.

(Continued)

*Primary Examiner* — Paul Marcantoni
(74) *Attorney, Agent, or Firm* — Dean W. Russell; Kristin M. Crall; Kilpatrick Townsend & Stockton LLP

(57) ABSTRACT

Embodiments of the present invention provide cellular phosphate bodies formed using specialized steps to ensure a specific strength range, and specifically a compressive strength less than 100 pounds per square inch. Further embodiments relate to uses for various phosphate ceramics as vehicle arresting systems.

22 Claims, 3 Drawing Sheets

(56) References Cited

U.S. PATENT DOCUMENTS

| | | | |
|---|---|---|---|
| 7,674,333 B2 * | 3/2010 | Wagh et al. | 106/801 |
| 7,699,928 B2 | 4/2010 | Paul, Jr. | |
| 7,744,693 B2 * | 6/2010 | Mabey | 106/801 |
| 7,789,149 B2 | 9/2010 | Santra et al. | |
| 7,833,344 B2 * | 11/2010 | Santra et al. | 106/685 |
| 2007/0051278 A1 | 3/2007 | Wagh et al. | |
| 2007/0077118 A1 | 4/2007 | Mahal et al. | |

OTHER PUBLICATIONS

International Preliminary Report on Patentability dated Jul. 26, 2012 in Application No. PCT/US2011/021240.

* cited by examiner

CELLULAR PHOSPHATE CERAMICS AND METHODS OF MANUFACTURE AND USE

This application claims the benefit of U.S. Provisional Application Ser. No. 61/294,986, filed Jan. 14, 2010 titled "Cellular Chemically Bonded Phosphate Ceramic Bodies," the entire contents of which are hereby incorporated by reference.

FIELD OF THE INVENTION

Embodiments of the present invention relate generally to cellular phosphate bodies formed using specialized steps to ensure a specific strength range, and specifically a compressive strength less than 100 pounds per square inch. Further embodiments relate to uses for various phosphate ceramics as vehicle arresting systems and other crushable or deformable materials.

BACKGROUND

Chemically Bonded Phosphate Ceramics (CBPC), also called "Phosphate Ceramics" are any chemically bonded phosphate compound of cementitious or ceramic nature, generally acquiring final strength at room temperature, but may also be further processed at low heating temperatures (40° C. to 600° C.), low firing temperatures (500° C. to 1000° C.) or by high firing temperatures (above 1000° C.), depending upon the final product application desired. Phosphate ceramics may include various inorganic products/bodies, but the common component is a phosphate compound-metal oxide binder.

CBPCs are typically fabricated by acid-base reactions between an inorganic oxide and either a phosphoric acid solution or a phosphate alkaline salt solution. They are formed by an exothermic reaction producing an early set ceramic-like body. A general example of the reaction is:

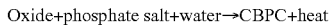

Oxide+phosphate salt+water→CBPC+heat

One example of a specific reaction is:

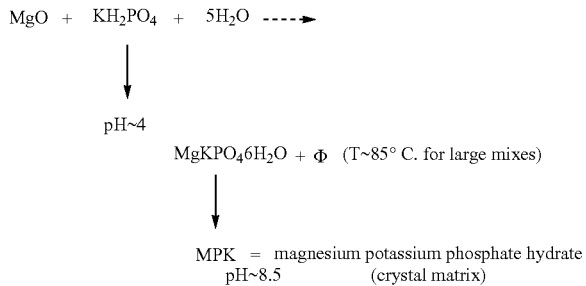

The body "sets" at room temperature, it is hard without the need to be fired, and it behaves like a ceramic. Accordingly, the products have been informally called "Cerami-crete" products. Such products have been known for many years, but it is within the last few years that they have surfaced as good candidates to produce fast-setting cements when they are mixed with water and any powdery by-product from many industries. The ability to use powdery by-products provides a new way to recycle and help develop a new "Green Clean Economy." For example, one research project conducted at Argonne National Labs encased radioactive waste within a solid indestructible paste-rock like material that can be entered in the earth (inside metallic drums) and will not leak harmful components over time.

Other examples of cerami-crete products are manufactured and sold by Bindan Corporation (e.g., Mono-patch®, which is sold and used as a road repair cement), Grancrete, Inc. (e.g., Grancrete™, which can be used as a protective coating or a replacement for concrete), and Ceratech Cement AB (Redi-Max™ and FireRok™). These materials are generally sold as fast-setting cement paste for cold weather applications using fine sand and Fly Ash C or F as fillers. The same phosphate binder added to styrene beads can be molded into ceiling panels. Adding the binder to gypsum and silicates can form bricks, panels, and other structural materials.

Foamed mixtures of phosphate bonded products may also be used to produce floor tiles, and insulation panels or bricks. These formulations do not add foam per se (e.g., prepared foam) to the mixture. Instead, the porous structure is caused by a chemical reaction among the components that release gases that are trapped in the solid. Additionally, the porosity is typically less than 5%, which results in a hard, solid body, generally having a strength higher than 500 psi (pounds per square inch). These formulations also do not render a structure that is so-called "cellular." It has been suggested to create a foamed fly ash by adding foam to a mix of Fly Ash F with an alkali as a activator, but the resulting structure is not a cerami-crete because it does not use a phosphate compound and a metal oxide (for example, magnesium oxide) as a binder mix.

Others have experimented with attempts to make a lightweight composite material with CBPC, but those experiments have resulted in CBPC composites with a compressive strength that is quite high (all generally above 100 psi at 24 hours post-mix). Those attempts have also used ammonium phosphate, which has been the preferred phosphate for the past many years, but ammonium phosphate has an adverse environmental impact because of the release of ammonium vapor during the chemical process. It is thus preferable to identify another phosphate material that can be used—one that does not release hazardous vapors into the environment.

Another example of a light weight phosphate cement is one that is manufactured for use as a sealant in heavy oil and CBM (coal bed methane) fields. See, e.g., U.S. Pat. No. 7,674,333. That cement is intended to have a very high compressive strength of at least 500 psi at 24 hours post-mix. The manufacturing process also does not use a foam; the disclosure simply refers to a "foaming agent" that can be added to the composition during the mixing process, not an already prepared foam/pre-foamed product.

In addition to being used as sealants, phosphate ceramic materials have also been used to make rigid, water-resistant phosphate ceramic materials for making tiles with acoustic channeling properties. See, e.g., U.S. Pat. No. 4,978,642. The process for preparing these tiles uses different binder materials and different methods to generate a porous structure than those described herein. Specifically, a chemical reaction is used to produce carbon dioxide gas. Most other references that seek to provide a foamed or lightweight product add a foaming agent or generate a chemical reaction during mixing to produce bubbles (e.g., either they foam through a chemical reaction with carbonate, they produce bubbles by a chemical reaction of decomposing hydrogen peroxide and evaporation of a liquid blowing agent such as Freon (which is environmentally hazardous), they use mechanical mixing to create bubbles, they burn organic materials during the firing process, or they otherwise use environmentally unfriendly materials for the mixtures). The resulting materials also have high tensile strengths of around 140 to about 350 psi, and some are upwards of 500 psi.

Most to all of the strength values reported by the prior art are typically measured at 24 hours post-mix because most of the strength is gained by then. However, the present inventors found a significant increase in strength in those formulations, caused either by curing or drying of the parts beyond one day. This does not particularly matter for these applications, because suggested applications for such materials include insulating panels, construction bricks, refractory materials, foundry filters, decorative structural ceramics, structural materials, floor tiles, and so forth—generally materials for which high strength is desired. Such applications are not concerned with an increase in strength multiple days post-mix—in fact, it is welcomed.

By contrast, if the material is intended for use as a safe and effective vehicle arresting barrier, the strength cannot be beyond the modeled value, or it will cause vehicle damage or endanger the vehicle occupants' lives. It is thus desirable to provide cellular phosphate ceramic materials that can be used for other applications, and thus, that have a lower compressive strength than the above-described materials at the fully-cured/dry state. As mentioned, one specific use that requires a material with a specific compressive strength is in the vehicle arresting technology. The compressive strength for such materials should be such that it absorbs the kinetic energy of a moving vehicle, rendering it effective in stopping the vehicle, but preferably crushing and absorbing the energy to prevent serious injury or death to the vehicle occupants. In other words, the material should be strong enough that it absorbs the vehicle's energy and helps stop the vehicle safely by the system's ability to crush or deform upon impact, and not so strong that it causes the vehicle to crumple against the barrier. The system is intended to cause the vehicle to decelerate more slowly and to provide more cushion than a traditional barrier, and thus, may be referred to in some instances as a "non-lethal" vehicle arresting system. This is one reason why the present application refers to the "fully-cured" material rather than the material at one or two days post-mix. A vehicle arresting barrier cannot be provided that becomes stronger with time—it would render the intent of barrier useless.

One example of a non-lethal vehicle arresting system or compressible vehicle arresting system includes material or a barrier that is placed at the end of a runway that will predictably and reliably crush (or otherwise deform) under the pressure of aircraft wheels traveling off the end of the runway. The resistance provided by the low-strength material decelerates the aircraft and brings it to a stop within the confines of the overrun area. An object of the vehicle arresting system is to fail in a predictable, specified manner, thereby providing controlled, predictable resistive force as the vehicle deforms the vehicle arresting system. A desired vehicle arresting system is thus generally compressible, deformable, crushable, or otherwise able to be compressed or deformed or crushed upon appropriate impact. The material strength should remain constant or at least not increase significantly with time. Specific examples of vehicle arresting systems are called Engineered Materials Arresting Systems (EMAS), and are now part of the U.S. airport design standards described in FAA Advisory Circular 150/5220-22A "Engineered Materials Arresting Systems (EMAS) for Aircraft Overruns" dated Sep. 30, 2005. EMAS and Runway Safety Area planning are guided by FAA Orders 5200.8 and 5200.9.

Alternatively, a compressible (or deformable) vehicle arresting system may be placed on or in a roadway or pedestrian walkway (or elsewhere), for example, for purposes of decelerating vehicles or objects other than aircraft. They may be used to safely stop cars, trains, trucks, motorcycles, tractors, mopeds, bicycles, boats, or any other vehicles that may gain speed and careen out of control, and thus need to be safely stopped.

Embodiments described herein thus provide phosphate ceramic materials that are manufactured using novel methods and that result in specific compressive strength ranges. The materials may be used in a number of applications, but they are particularly suited for use as non-lethal vehicle arresting systems or blast attenuation composite materials.

BRIEF SUMMARY

Embodiments of the present invention provide cellular phosphate bodies formed using specialized steps to ensure a specific strength range, and specifically, a compressive strength less than 100 pounds per square inch. They further relate to methods of manufacturing such materials using prepared foams. Further embodiments relate to uses for various phosphate ceramics as vehicle arresting systems and other crushable or deformable materials.

DETAILED DESCRIPTION

Figure 1:
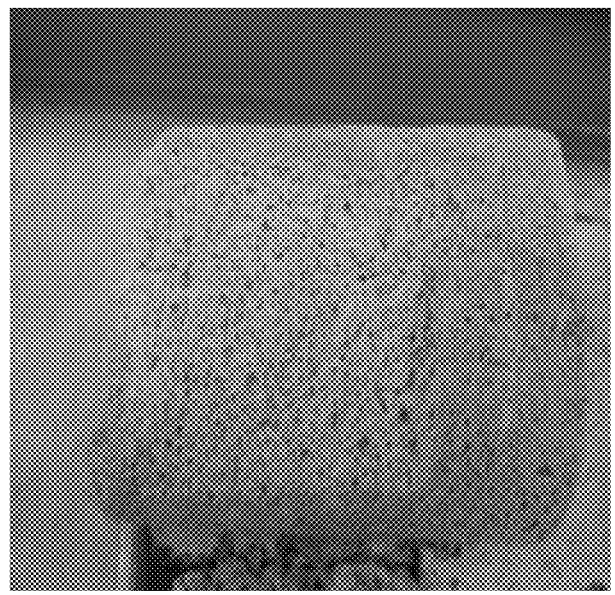
FIG. 1 shows a perspective view of an open cell phosphate ceramic structure made according to various embodiments described herein.

Cellular phosphate ceramics are inorganic products. They do not burn, they are resistant to water absorption, they do not dissolve, and they set at ambient temperature with ceramic-like strength. Consequently, these materials can be used in lieu of concrete outdoors in cold weather because the setting process releases heat and hardens within hours, and generally fully cures within a week to a month, depending on the composition.

Most chemically bonded phosphate ceramics that result in any type of a cellular structure as the end product typically incorporate a foaming agent or other chemical or mechanical mixing process during the manufacturing process in order to create bubbles or a foam-like appearance in the material. For example, air may be introduced to produce a cellular structure by adding a foaming agent and mechanically foaming the slurry. This is somewhat akin to adding a surfactant or dish detergent to water and stirring it up to create a foam. The intent has been to provide a porous cellular ceramic body in order to help reduce cracking due to freezing, thus making the products suitable for use in low temperature climates. However, the reported compression strength of these materials has been quite high, e.g., over 100 psi at 24 hours, and it has not been measured/reported beyond this time. It is believed that these materials continue to harden and cure even more over time, and thus, the ultimate compressive strengths are even higher than those reported.

Without wishing to be bound to any theory, it is believed that this high strength may be imparted at least in part due to the mechanical mixing needed to create the foam from the added surfactant, similar to the way that bread becomes tough due to excess kneading. (This is, of course, in addition to the selection and proportions of materials added.) The resulting materials are thus not useful as energy absorption materials, but are instead, more suited to uses where the ultimate compressive strength is not important (or is typically very high), such as tiles, panels, bricks, and so forth.

These building and construction materials have a high compressive strength—well beyond the compressive strengths of the materials made by the methods described herein. Such construction-related materials need to have such high strengths in order to provide strength as building foundations, sides, and other components. By contrast, using the materials made by the methods described herein would generally not work in the tradition building construction field because they would be too weak and crushable. In short, any materials manufactured using typical construction materials and mixing methods will be beyond the maximum strength required for non-lethal vehicle arresting systems.

Applicants have identified that by adding a prepared foam to the mixture, they are able to better control the resulting compressive strength. Continuing with the dish detergent and water analogy, the present description is more similar to adding a shaving cream or bubbles (e.g., prepared foam) to the water (e.g., slurry), such that no mixing is needed to form the foam.

The strength and lightweight characteristics of the resulting cellular materials make them excellent materials for energy absorption such as blast attenuation, vehicle arresting systems, heat and sound insulation, crushable safety barriers, and/or flowable fill materials. The internal structure is generally crystalline and amorphous, depending on the fillers used and the ratio of binder components used. Specific embodiments of the products have excellent water resistance, making them good candidates for ground applications, because the material does not effloresce or leach harmful products into the ground.

Embodiments of the present invention thus relate generally to (1) new cellular phosphate ceramics and methods for their manufacture and (2) methods for using cellular phosphate ceramics as non-lethal vehicle arresting systems.

Regarding the new materials and methods of manufacture, one embodiment provides a cellular phosphate ceramic that includes the following components:

Binary binder+Filler(s)+Water (to form a slurry)+ Prepared foam

Binary binder. The binary binder component is made up of two components in different proportions, depending upon the end application. The first component is a phosphate compound, and the second component is a metal oxide compound.

The phosphate compound may be mono-potassium phosphate ($KH_2PO_4$), mono-sodium Phosphate ($NaH_2PO_4$), ammonium phosphate (($NH_4)H_2PO_4$), phosphoric acid ($H_3PO_4$), or any other derivate with ($P_2O_5$) or phosphorous penta-valent, or any other mono (1), di (2) or tri (3) alkaline phosphate, such as aluminum phosphate ($AlPO_4$), calcium phosphate ($CaHPO_4$), including any of the so-called super-phosphate or ortho-phosphate or pyro-phosphate derivative.

The metal oxide compound may be formed by an alkali, alkali earth, transition, or post-transition metals such as magnesium, calcium, zirconium, or aluminum and oxygen. Examples of suitable metal oxides include magnesium oxide calcium oxide, zirconium dioxide, aluminum oxide, and manganese(II) oxide. Oxide derivatives such as $Al(OH)_3$ and $Zr(OH)_4$ are also viable candidates. If the metal oxide is provided as a magnesium oxide, viable candidates include but are not limited to a magnesium oxide powder, magnesia, calcined magnesia, calcined magnasite, or any other appropriate magnesium composition. The composition may have varying fineness and purity. Various commercial, medical, and/or industrial grades of metal oxide may be used, depending upon the desired properties. One example of a commercially available magnesium oxide that may be used is Martin Marietta Magnesia Specialties, LLC MagChem® 35. Another example is American Elements® spray dried alumina oxide powder.

Filler. The filler component may be reactive or inert or a mix of both. The fillers could be any single component or blend, including but not limited to: fly ash C, fly ash F, slag, foundry ashes, red mud, silica ashes, grinded glass, cenospheres, wollastonite, expanded polystyrene, light weight organic aggregates, wood pulp, recycled plastics, air, gypsum, fine sand, any calcium-alumina-silicate powder, such as hydraulic cement or cementitious mixes (not including Portland cement), or any other appropriate powder-like or filler material.

Foam. The foam component is generally provided in a state such that it is a "prepared foam" prior to being combined with the slurry. It may be formed by combining an appropriate surfactant solution, water, and air, in order to form bubbles prior to being combined with the above composition/slurry. For example, the surfactant may be cationic (including but not limited to quaternary ammonium compounds, amines (primary, secondary, tertiary, diamines, polyamines) and/or amine salts), it may be anionic (including but not limited to sodium lauryl sulfate or alpha-olefin sulfonates), or it may be non-ionic type (including but not limited to ethers or fatty alcohols). The choice of foam used depends on the binder and/or fillers added, the resulting end application, and the desired cellular structure. The foam is formed on-site prior to being added to the slurry by foaming equipment. Exemplary foam brands that may be used include but are not limited to Mearlcrete® Geofoam, Cellufoam™, GreenFroth®, and/or MaxFlow® Foam Concentrate. Foam concentrate manufactures may also provide their own foaming equipment.

The use of a prepared foam helps the resulting product achieve a lower strength, compared to previous cerami-crete products which are manufactured by adding the plain surfactant into the water and mechanically mixing the slurry to form bubbles. Previous cerami-crete products contain air but are not designed to be cellular materials. Specifically, the ratios of slurry/foam used are such that the compressive strength of the material is less than about 100 psi, and more particularly, less than about 50 psi, and even more particularly, about 15 psi or less at the fully cured state. More specific range options are outlined herein. The foam creates a cellular structure, essentially trapping air bubbles in the final product. Air becomes a major component of the final product, unlike prior cerami-crete products.

It should be understood that although the present inventors believe that using a prepared foam combined with the slurry is one of the steps that allow the products described herein to obtain the desired low compressive strengths, it is believed (and intended to be encompassed within the scope of this disclosure) that special agitation equipment or surfactants may be developed in the future that allow lower resulting compressive strengths. Although the examples provided herein use prepared foam, it should be understood that surfactants, bubble-generating materials, pore-generating materials, cellular-generating materials, or any other type of strength lowering material may be developed and used in accordance with this invention in order to obtain a resulting product with a fully cured compressive strength within the described ranges.

It may also be possible to add one or more buffer or set/cure retardant agents, such as boric acid, borax, or any other suitable compound in order to retard the binder reaction if desired. In a specific embodiment, the more boric acid that is added, the more slowly the structure will cure.

Exemplary but non-limiting examples of formulations that have been manufactured and found useful in various uses described herein follow. It should be understood that these examples are intended for illustrative purposes only, and are not intended to limit the invention in any way. Various mixing times and mixing orders can, of course, be used, depending upon the desired application and properties.

In one embodiment, the dry materials may be premixed together and then added to water to create a slurry. For example, the phosphate, magnesium oxide, and fillers (as well as an optional set/cure retardant) may be mixed together for a first mix time and then added to water and mixed for a second mix time. Alternatively, the dry materials may be added to water in a specific order. For example, filler and magnesium oxide may be mixed together; then a set/cure retardant (e.g., borax) and phosphate may be added to water and then the two compositions mixed together, although any mixture combinations are possible.

In another embodiment, the dry materials may be premixed together and then added to water to create a slurry in a specialty high shear batch mixer. A foam concentrate may then be added to the specialty high shear batch mixer and foamed by the mixer. For example, the phosphate, metal oxide, and fillers (as well as an optional set/cure retardant) may be mixed together for a first mix time, then added to water and mixed for a second mix time, and then foam concentrate may be added to the mixer followed by a third mix time. Exemplary, non-limiting surfactant/water ratios include about 1/50, 1/45, 1/40, 1/35, 1/30. In addition, exemplary non-limiting final air volume percents are about 70 to about 95%, about 75 to about 85%, about 85 to about 95%, about 80%, or about 90%. One example of a specialty high shear batch mixer is a Silverson® High Shear Batch Mixer.

In another embodiment, dry materials may premixed and then added in a continuous fashion to a specialty high shear continuous mixer which homogenizes and disperses the powder. For example, the phosphate, metal oxide, and fillers (as well as an optional set/cure retardant) may be mixed together and then fed by an auger into the specialty mixer. A surfactant may be injected into the system with or without air and foamed by the mixer in a continuous fashion. Exemplary, non-limiting surfactant/water ratios include about 1/50, 1/45, 1/40, 1/35, 1/30. In addition exemplary non limiting final air volume percents are about 70 to about 95%, about 75 to about 85%, about 85 to about 95%, about 80%, or about 90%. One example of a specialty high shear continuous mixer is IKA® MHD 2000 Series.

In a particular embodiment, the dry components may comprise a phosphate compound (in a specific embodiment, potassium phosphate), a metal oxide (in a specific embodiment, magnesium oxide), fly ash, silica, wollastonite, and borax, which are mixed for a first mix time until combined to create a well-blended first powder. The first mix time may be any time that is appropriate to combine the materials to create a first powder. These components may be provided in any desired ratios, depending upon the desired properties (such as compressive strength, cell structure, etc.) of the end product. Non-limiting examples of potential phosphate compound to magnesium oxide ratios can be anywhere from about 1 to about 1; about 3 to about 1; about 5 to about 1; about 10 to about 1; about 1 to about 3; about 1 to about 5; about 1 to about 10; or any other appropriate ratio in between. The below chart provides exemplary and non-limiting ratios:

| Sample ID | Fly Ash C % | Fumed Silica % | Wollastinite % | Binder % | Binder ratio (MKP/MgO) | Solid/Water Ratio | Foam Type | 28 day Compressive (psi) |
|---|---|---|---|---|---|---|---|---|
| 1 | 50 | 0 | 0 | 50 | 1 | 6.7 | Geofoam SP | 53 |
| 2 | 25 | 0 | 25 | 50 | 3 | 5.0 | Geofoam SP | 33 |
| 3 | 25 | 25 | 0 | 50 | 1 | 5.0 | Geofoam SP | 41 |
| 4 | 25 | 0 | 25 | 50 | 1 | 4.7 | Geofoam SP | 15.4 |

Notes:
MKP = Mono-Potassium Phosphate,
MgO = Magnesium Oxide

Once mixed, the first powder is then added to water and mixed for a second mix time in order to form a slurry. Mix times depend on the ratios and types of materials used, the equipment, the temperature, and other factors. Typically, it has been found that the second mix time may be anywhere from about 30 seconds to about 45 minutes, and about one to about ten minutes, or about one to about five minutes is generally sufficient, although shorter and longer mix times are possible. The second mix may be accomplished using a high shear mixer.

The second mix time may be based on the amount of set/cure retardant that is used, if any. If it desired to slow the set or cure time of the slurry and/or the final end product, a set/cure retardant may be added, although not required. One non-limiting example of an appropriate set/cure retardant is borax or a boric acid. The more set/cure retardant that is added, the longer the set/cure time may be, which means that the first powder/water slurry can be mixed for longer without setting prematurely. Non-limiting examples of ranges for the set/cure retardant to slurry ratios that have been found acceptable for creating a sufficient set/cure time are about 0 (parts set/cure retardant by weight) to about 5 (parts slurry by weight); about 0.1 to about 5; about 0.1 to about 3; about 0.1 to about 2; about 0.25 to about 5; about 0.25 to about 3; about 0.25 to about 2; or any ratio therebetween.

A separate step is the making of the prepared foam by using a specially selected foaming agent, air and using foaming equipment. The foam may be provided as a foam concentrate or other surfactant that can be mixed with water to create a foam. The prepared foam may then be poured into a paddle or auger-type mixer. The slurry described above is then folded into the foam. Although the slurry is typically folded into the foam, it should be understood that it is also possible to fold the foam into the slurry. Either way, the components are formed separately and then added together as a separate step. Foam incorporation occurs after the water and solids/powders are fully mixed and before the product begins to set. This incorporation step is referred to here as "folding" or "blending" rather than "mixing," because the foam should not be mixed too vigorously or for too long in order to prevent the foam structure from breaking down.

A useful analogy for this step is blending or folding a cake batter or other mixture into pre-whipped egg whites or pre-whipped cream. If the batter is blended into the pre-whipped components too vigorously or for too long, the foam/bubbles created in the pre-whipped component will break down. Likewise, in order to preserve the foam structure, the slurry described herein should not be added too vigorously or blended into the prepared foam for too long.

The slurry/foam blending time, blending speed, and blending equipment can be varied to produce the desired low strength material. Typically, it has been found that the slurry/foam blend time may be up to about ten minutes, but anywhere from about thirty seconds to about five minutes, and more specifically, from about two to about three minutes is generally sufficient, although shorter and longer mix times are possible. In any event, the blend time should be long enough to incorporate the foam and slurry together, but not so long that the foam structure is drastically disturbed. If the blending step is too vigorous or too long, the foam structure may collapse or become irregular. The goal is maintain the structural integrity of the foam in order to maintain cellular properties, and to preferably maintain a generally uniform pore size throughout the end material. The blend may be accomplished using a low speed machine, such as a paddle mixer, an auger-type mixer, or any other low shear mixer or blender.

Non-limiting examples of ranges for the slurry to foam ratios that have been found acceptable for creating useful end products are about 20 (parts slurry by weight) to about 1 (parts prepared foam by weight); about 15 to about 1; about 12 to about 1; about 7 to about 1; about 5 to about 1; about 4 to about 1, about 2 to about 1; about 1 to about 1; or any ratio therebetween. The higher the slurry to foam ratio, the stronger the expected compressive strength of the final product upon final cure.

One method of targeting a desired final strength is by monitoring the wet density of the slurry foam mixture. The target range is dependent on the desired application. Exemplary, non-limiting density ranges include: about 1 to about 120 lb/ft$^3$, about 30 lb/ft$^3$, about 1 to about 50 lb/ft$^3$, about 40 lb/ft$^3$, about 50 to about 100 lb/ft$^3$, about 80 to about 120 lb/ft$^3$, about 20 to about 40 lb/ft$^3$, about 40 to about 60 lb/ft$^3$, about 50 lb/ft$^3$, about 5 to about 20 lb/ft$^3$, about 60 to about 80 lb/ft$^3$, about 60 lb/ft$^3$, about 80 to about 100 lb/ft$^3$, about 70 lb/ft$^3$, about 100 to about 120 lb/ft$^3$, about 90 lb/ft$^3$, about 25 to about 50 lb/ft$^3$, about 35 lb/ft$^3$, about 50 to about 75 lb/ft$^3$, about 65 lb/ft$^3$, about 75 to about 100 lb/ft$^3$, about 10 lb/ft$^3$, about 5 to about 15 lb/ft$^3$. or any other appropriate range.

The addition of prepared foam produces a generally lightweight, porous (aerated) suspension that could have an early set of a few minutes to a few hours, and is fully cured within days or weeks (depending on the fillers) into a cellular ceramic-like material. Strength is typically measured at a few weeks out, usually at a month (or about 28 days, which is the standard in the cement industry for cementitious mixes), at which point the material is considered "fully cured." For example, the day after the product is made, its compressive strength could be only a percentage of what its fully cured strength will be, as most materials continue to cure naturally, and thus, continue to gain strength. Most prior art references report strength only at 24 hours because in those intended applications, strength growth beyond one day is not important. However, for the uses described herein, strength increases or strength growth must be pre-determined and accounted for.

The final body strength and material properties may be adjusted by changing the proportions of binder-filler, the amount of foam added into the slurry, the filler composition and type (reactive or non-reactive) and amount, particle size or finesses, the mixing procedures, the mix time, the blending procedures, and/or the blend time. The solids/water ratio may vary with the binder (set/cure retardant) and filler types added, the binder/filler proportions, and final desired properties according to the intended end application for the material. The more water added, the more fluid the foamed green structure will be, and a lower strength may be achieved. The slurry/foam ratio may be adjusted to meet the final hardened properties desired in density and strength. The dry density of the body depends on desired final strength. If desired, the color may be tinted for decorative purposes by the addition of pigments of the desired hue.

The final, fully cured compressive strength of the end product may be as low as 5 psi and as high 100 psi, depending upon the fillers, porosity, density and water/solid ratio and slurry/foam ratios used. The ultimate desired compressive strength is typically not measured within a few hours or at one day, but is instead measured a few weeks out, typically, the final hardness will be reached (and measured) at about 28 days post-mix. Exemplary compressive strength ranges may be any of the following non-limiting examples: about 100 psi or less; about 5 to about 95 psi. Depending on specific application requirements the range can be tailored to fit within a narrower range, for example:

about 10 psi to about 90 psi; below about 50 psi; about 50 psi; about 20 psi to about 80 psi; below about 60 psi; about 60 psi; about 30 psi to about 70 psi; below about 40 psi; about 40 psi; about 40 psi to about 60 psi; below about 45 psi; about 45 psi; about 50 psi to about 70 psi; about 65 psi; about 15 psi to about 85 psi; about 25 psi to about 75 psi; about 35 psi to about 65 psi; about 45 psi to about 55 psi; about 50 to about 100 psi; about 60 to about 90 psi; about 65 to about 85 psi; about 70 to about 80 psi; less than about 75 psi; about 75 psi; below about 50 psi; below about 60 psi; below 75 psi; about 55 psi; about 60 psi, about 75 psi; about 60 psi to about 85 psi; about 70 psi to about 85 psi; about 40 to about 90 psi; about 45 to about 90 psi; about 50 to about 90 psi; about 55 to about 90 psi; about 60 to about 90 psi; about 65 to about 90 psi; about 70 to about 90 psi; about 75 to about 90 psi; about 80 to about 90 psi; about 85 psi; less than about 85 psi; about 10 to about 60 psi; about 40 psi; less than about 40 psi; about 10 to about 50 psi; about 30 psi; less than about 30 psi; about 10 to about 45 psi; about 35 psi; less than about 35 psi; about 5 to about 50 psi; about 25 psi; less than about 25 psi; about 5 to about 30 psi; about 20 psi; less than about 20 psi; about 10 to about 30 psi; about 10 to about 25 psi; about 15 to about 85 psi; about 15 to about 50 psi; about 15 to about 40 psi; out 15 to about 35 psi; out 20 to about 65 psi; about 20 to about 55 psi; about 20 to about 40 psi; about 20 to about 35 psi; about 20 to about 30 psi; about 25 to about 35 psi; about 30 to about 40 psi; or any other appropriate range therein.

The foamed slurry may be poured into one or more molds in order to produce one or more molded pieces as the final product, or it may be pumped in bulk as other cellular fillers. In one specific example, the inventors added a foam to Grancrete (which is a commercial mix sold as a pumpable slurry), which produced a cellular structure with a stable form and low strength.

The end product of the cellular phosphate ceramic bodies described herein may be used for multiple purposes, including but not limited to substituting for any of the materials described in co-owned U.S. Pat. No. 5,885,025 or U.S. Patent Application Publication No. 2007/0077118. Specifically, those documents describe the use of cellular concrete in vehicle arresting bed applications in order to stop aircraft, inhibit certain vehicular traffic, or otherwise absorb kinetic energy (and specifically, the kinetic energy of a moving vehicle). Material desired for use in such applications is preferably strong enough to maintain at least some structure upon impact but to predictably crush or deform, but is not so strong that it causes the moving vehicle to crash at impact.

Exemplary and non-limiting strength ranges for various vehicles include, but are certainly not limited to the below-described ranges. Large aircraft typically require a higher strength range (about 15-90 psi), depending not only on the material final properties, but also on the aircraft design, speed of engagement, weather conditions, airport location, airport traffic, etc. Small and medium aircraft typically require a lower strength range (about 5 to 70 psi), depending on same factors listed above. Road vehicles may require a wider range (about 5 to 90 psi) depending on the vehicle design, speed, driving conditions, specific road location and size, road traffic patterns, accessibility, and weather conditions, and so forth. The overriding consideration is to provide a controlled, safe deformation of the arresting system barrier, which stops the vehicle wheels, but preferably prevents a deadly crash to the vehicle occupants.

The material is also preferably uniform in its resistance to deformation, since it is the predictability of forces acting on the surface of contacting members of the vehicle being stopped that allow the bed to be designed, sized, and constructed in a manner that will ensure acceptable performance. In order to obtain such uniformity, the conditions under which the material is processed and its curing regime should be considered. Providing a material with relatively small internal cells or bubbles of a fluid, such as air, provided by the addition of a prepared foam as described herein, helps provide the desired compressive strength.

Construction of vehicle arresting systems can be accomplished by producing the cellular material at a central production facility (and then transporting the sections to the site for installation) or preparing them on-site where the desired system will reside (by pouring the formed slurry into forms of appropriate dimensions to achieve the desired geometry).

Two other major areas where the material described herein may be used include light-weight green construction material components and low-strength loose fillers, either with open or close cell structures where a weak structure filling material may be required or desired. For example, the material may be used for manufacturing light-weight structures, blocks, insulation panels, wall panels, tilt-up panels, sound barriers, crash barriers, low-strength pervious concrete ceilings, landfill materials, mine and well shaft fillings, or any other soft ground loose environmental or temporary fillings.

Figure 2:
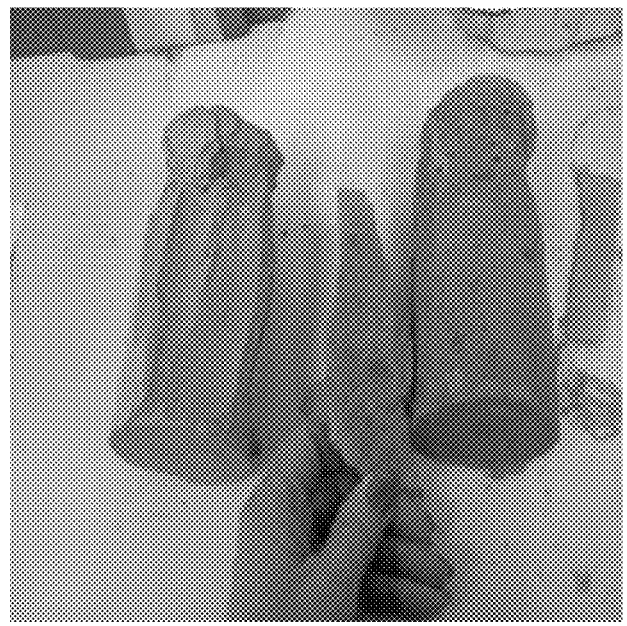
FIG. 2 shows a perspective view of a closed cell phosphate ceramic structure made according to various embodiments described herein.
Figure 3:
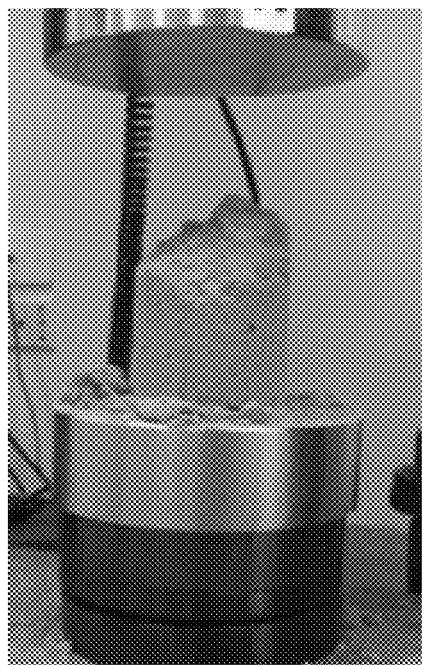
FIG. 3 shows a perspective view of a cellular phosphate ceramic structure after compression testing.
Figure 4:
FIG. 4 shows samples de-molded at one day.

Referring now to the figures, the cellular structure may be an "open cell" structure, as shown in FIG. 1. Open pores will allow water, in the state of vapor or liquid, to percolate through the structure. Alternatively, the cellular structure may be "closed cell," as shown in FIG. 2. In this embodiment, the pores do not "communicate" with each other to form a path, and thus will not allow water to penetrate therethrough. In either case, the material may look like a common cellular concrete structure, a ceramic filter, or a porous cementitious body.

Whether the end structure is considered an "open cell" or a "closed cell" material generally depends upon the type of foam used and the fineness of the starting powders used. It should be understood that reference to an "open cell structure" does not imply that all cells are open, simply that there are more open cells than closed cells. Likewise, reference to a "closed cell structure" does not imply that all cells are closed, simply that there are more closed cells than open cells. In fact, there are rarely structures that have all open cells or all closed cells; most are a combination thereof, with more open than closed (or vice versa).

Figure 5:
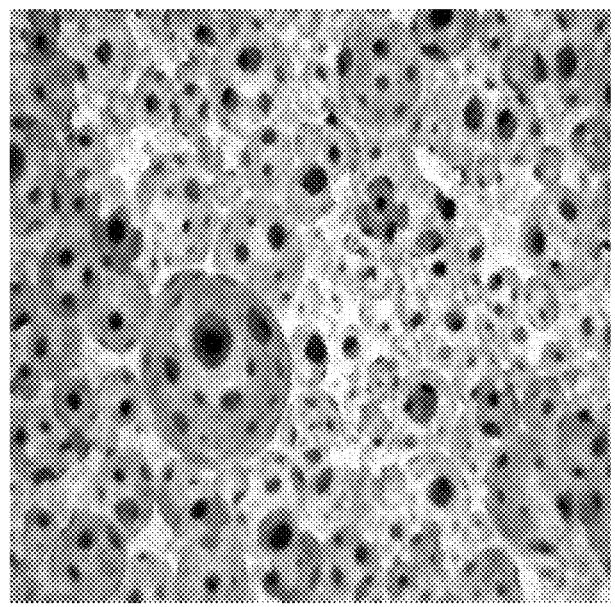
FIG. 5 shows a microscopic view of an open cellular structure made according to various embodiments described herein.
Figure 6:
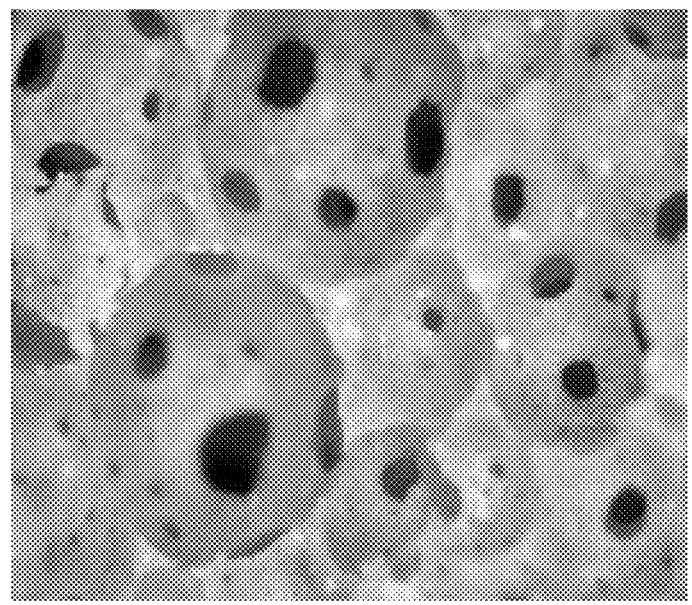
FIG. 6 shows a close-up view of FIG. 5.

FIG. 5 illustrates a microscopic structure of an open cell structure, with the binder indicated by the lighter color and the darker grains representing the filler. The cells created by the foam are also shown. FIG. 6 is a closer view, showing open channels formed by connected bubbles.

An added advantage of the present invention is the possibility of recycling waste materials, such as fly ash, bottom ash, slag, or any other powdery materials, making the use of these products favorable in a Green economy. Most of the potential fillers have the advantage of being of lower cost than Portland cement, and they do not carry the legacy of the high emissions of $CO_2$ produced while being manufactured.

Additionally, although the primary intent is that the formulation described above cure naturally (i.e., without being fired), if desired, the phosphate ceramic formulations can be fired to produce "cellular foamed glass." In other words, the same formulation can produce a final product at room temperature, or can be soft fired (under 1000° C.), or high fired like a glass or common ceramic, depending upon the desired application and initial raw materials used. With certain firing techniques, the resulting material may have similar structure and properties as the well-known FoamGlas® made by Pittsburgh Corning Corporation or Misapor®, the European counterpart. These materials are made with different, more costly processes (which require high energy firing) and pre-processed raw materials. These manufacturers produce a closed cell glassy structure by firing slurries loaded with calcium carbonate ($CaCO_3$), calcium-sulfate ($CaSO_4$) and/or sodium carbonate ($Na_2CO_3$), and aluminum powder ($Al_3O_3$) that release gases like carbon dioxide ($CO_2$), sulfur oxide ($SO_2$) or hydrogen ($H_2$) during the firing. These gases are "trapped" in the solid slurry as it fires, producing the porous structure called "foam glass."

However, that process is more expensive than conventional firing, since it may need a special inert atmosphere and/or additional pre and post firing steps. Additionally, the bubbles formed in the final piece may contain toxic gases that may be released later on. There are also limitations on sample size, especially in height or wall thickness of the final pieces. Accordingly, as described above, the inventors have identified more desirable methods of manufacture for preparing cellular ceramic or foamed glass over the conventional foam glass currently available in the market.

More specifically, a phosphate ceramic "cellular foamed glass" may be made by adding the prepared foam into the slurry in the green stage. The cellular structure is formed in the green state before firing. Once the parts are dry, they are fired to the temperature and cycle needed according to the desired final properties in a common air atmosphere furnace. There are fewer size limitations, and no toxic gases are produced during firing. The foamed glass produced in this way may have an open or closed structure. If any gas is trapped inside, it would be air or carbon dioxide, and not of a toxic nature. It is also easier to control the compression strength of the final piece by controlling the slurry/foam ratio when manufacturing the green body, unlike the classic foam glass manufacture methods, which add chemical compounds that react to form bubbles during firing and mechanically mix raw materials, and which may lead to a non-uniform cellular structure (e.g., if the materials are not well blended and/or if particle sizes are not well distributed throughout the slurry), rather than using a prepared foam as described herein.

Changes and modifications, additions and deletions may be made to the structures and methods recited above and shown in the drawings without departing from the scope or spirit of the invention and the following claims.

What is claimed is:

1. A cellular phosphate ceramic material, comprising:
   a binder comprised of a phosphate compound and a metal oxide, wherein the binder is mixed with water to form a slurry; and
   a foam;
   wherein the foam is combined with the slurry in an amount effective to form a cellular phosphate ceramic material having a 28-day compressive strength of less than 100 psi.

2. The material of claim 1, wherein the phosphate compound is potassium phosphate.

3. The material of claim 1, wherein the metal oxide is magnesium oxide.

4. The material of claim 1, wherein the foam comprises a cationic, an anionic, a non-ionic surfactant, air, water, or any combination thereof.

5. The material of claim 4, wherein the foam is generated separately from the slurry prior to being combined with the slurry.

6. The material of claim 1, wherein the 28-day compressive strength is between about 5 to about 90 pounds per square inch.

7. The material of claim 1, further comprising one or more set/cure retarders.

8. The material of claim 1, further comprising one or more fillers.

9. The material of claim 1, wherein the cellular phosphate ceramic material is an open cell or a closed cell material.

10. The material of claim 1, wherein the cellular phosphate ceramic material is used as a vehicle arresting system, as an energy absorbing material, or as an insulation material.

11. A method of manufacturing the cellular phosphate ceramic material of claim 1, comprising:
   a) obtaining or making a foam;
   b) mixing a phosphate compound and a metal oxide powder for a first mix time effective to form a powder blend;
   c) mixing the powder blend with water for a second mix time effective to form a slurry;
   d) mixing the slurry and the foam together for a blend time effective to form a cellular phosphate ceramic material; and
   e) curing to form a ceramic material having a 28 day compressive strength of less than 100 psi.

12. The method of claim 11, further comprising adding one or more set/cure retarders.

13. The method of claim 11, further comprising adding one or more fillers.

14. The method of claim 11, wherein the mixing the powder blend with water step is conducted with a high shear mixer.

15. The method of claim 11, wherein the folding the slurry into the foam step is conducted with a low shear mixer, a paddle, or an auger mixer.

16. The method of claim 11, wherein the blend time is less than about 45 minutes.

17. The method of claim 11, wherein the phosphate compound is potassium phosphate.

18. The method of claim 11, wherein the metal oxide powder is magnesium oxide.

19. The method of claim 11, wherein the foam comprises a cationic, an anionic, a non-ionic surfactant, air, water, or any combination thereof.

20. The method of claim 11, wherein the foam comprises an anionic surfactant blend with foaming action and high expansion rate, water and air foamed by foam generating equipment, or any combination thereof.

21. The material of claim 1, further comprising one or more fillers comprising fly ash C, fly ash F, slag, foundry ashes, red mud, expanded polystyrene, organic aggregates, wood pulp, recycled plastics, air, silica ashes, ground glass, cenospheres, wollastonite, gypsum, sand, calcium-alumina-silicate powder, hydraulic cement or cementitious mixes, but not Portland cement, or any combination thereof.

22. A cellular phosphate ceramic material made by:
   (a) mixing potassium phosphate and magnesium oxide to form a binder;
   (b) adding one or more fillers;
   (c) mixing the binder and filler(s) with water to form a slurry;
   (d) obtaining or making a foam;
   (e) blending sufficient foam and binder, wherein the foam structure is preserved; and
   (f) curing the ceramic material to form a cellular phosphate material having a 28-day compressive strength of less than 100 psi.

* * * * *